(12) United States Patent
Miyabe

(10) Patent No.: US 10,846,026 B2
(45) Date of Patent: Nov. 24, 2020

(54) INFORMATION PROCESSING APPARATUS, INFORMATION PROCESSING SYSTEM, AND NON-TRANSITORY RECORDING MEDIUM STORING INSTRUCTIONS FOR EXECUTING AN INFORMATION PROCESSING METHOD

(71) Applicant: Kazuhiro Miyabe, Kanagawa (JP)

(72) Inventor: Kazuhiro Miyabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/293,688

(22) Filed: Mar. 6, 2019

(65) Prior Publication Data

US 2019/0278530 A1 Sep. 12, 2019

(30) Foreign Application Priority Data

Mar. 9, 2018 (JP) ................................ 2018-043628

(51) Int. Cl.
*G06F 3/12* (2006.01)

(52) U.S. Cl.
CPC .......... *G06F 3/1204* (2013.01); *G06F 3/1254* (2013.01); *G06F 3/1276* (2013.01); *G06F 3/1284* (2013.01)

(58) Field of Classification Search
CPC .... G06F 3/1229; G06F 3/1232; G06F 3/1231; G06F 3/1236; G06F 3/1284; G06F 3/129; G06F 3/1224; G06F 3/1225; H04N 2201/0072
See application file for complete search history.

(56) References Cited

U.S. PATENT DOCUMENTS

| | | | |
|---|---|---|---|
| 2004/0105113 A1* | 6/2004 | Ishida | G06F 3/1205 358/1.13 |
| 2013/0067120 A1* | 3/2013 | Forrest | G06F 13/387 710/19 |
| 2016/0077770 A1* | 3/2016 | Morita | G06F 3/1253 358/1.15 |
| 2016/0274845 A1* | 9/2016 | Wakasa | G06F 3/1254 |
| 2016/0275388 A1* | 9/2016 | Wakasa | G06K 15/4045 |
| 2019/0012121 A1 | 1/2019 | Miyabe | |

FOREIGN PATENT DOCUMENTS

| | | |
|---|---|---|
| JP | 2016-021157 | 2/2016 |
| JP | 2016-035658 | 3/2016 |

* cited by examiner

*Primary Examiner* — Kent Yip
(74) *Attorney, Agent, or Firm* — Oblon, McClelland, Maier & Neustadt, L.L.P.

(57) ABSTRACT

An information processing apparatus, system, and a non-transitory recording medium storing instructions for executing an information processing method. The information processing system includes the information processing apparatus with one or more printer drivers installed and an image forming apparatus connected to the information processing apparatus to perform bidirectional communication with the image forming apparatus in response to a request from at least one of the printer drivers, by setting control information in a storage area corresponding to the printer driver and requesting a communication control program to perform the bidirectional communication with the image forming apparatus based on a control information set for the printer driver.

15 Claims, 17 Drawing Sheets

FIG. 8A

```
                         ~724
┌──────────────────────────┐
│     REQUEST COMMAND      │
├──────────────────────────┤
│     @PJL INFO OPTION     │
├──────────────────────────┤
│      @PJL INFO TRAY      │
├──────────────────────────┤
│            ...           │
└──────────────────────────┘
```

FIG. 8B

| REQUEST COMMAND KEY | VALUE |
|---|---|
| BidiRequestCommand | @PJL INFO OPTION |
|  | @PJL INFO TRAY |
|  | ... |

FIG. 8C

```
                                               ~801
┌──────────────────────────────────────────────────┐
│  Option                                          │
│                   DuplexUnit=ON                  │
│                   HardDisk=ON                    │
│                   Memory=256MB                   │
│  InputTray                                       │
│                                                  │
│                   Tray1=A4                       │
│                   Bypass=A5                      │
└──────────────────────────────────────────────────┘
```

FIG. 8D

| REQUEST COMMAND KEY | VALUE |
|---|---|
| BidiRequestCommand 1 | @PJL INFO OPTION |
|  | @PJL INFO TRAY |
| BidiRequestCommand 2 | @PJL INFO MEMORY |
| ... | ... |

FIG. 10

| REQUEST COMMAND | TRANSMISSION CONDITION |
|---|---|
| @PJL INFO OPTION | True |
| @PJL INFO TRAY | True |
| @PJL INFO OPTIONTRAY | If(OptionTrayON) |

FIG. 15B

| REQUEST COMMAND KEY | VALUE |
|---|---|
| BidiRequestCommand | @PJL INFO OPTION: True |
| | @PJL INFO TRAY: True |
| | @PJLINFO OPTIONTRAY: If (OptionTrayON) |

| REQUEST COMMAND KEY | VALUE |
|---|---|
| BidiRequestCommand | varconditions = [<br>  { request: "@PJL INFO OPTION", condition: function(response) { return true; } },<br>  { request: "@PJL INFO TRAY", condition: function(response) { return true; } },<br>  { request: "@PJL INFO OPTIONTRAY", condition: function(response) { if(include(response, "OptionTray=ON")) return true; else return false; } }<br>];<br>varconditions = [<br>  { request: "@PJL INFO OPTION", condition: function(response) { return true; } },<br>  { request: "@PJL INFO TRAY", condition: function(response) { return true; } },<br>  { request: "@PJL INFO OPTIONTRAY", condition: function(response) { if(include(response, "OptionTray=ON")) return true; else return false; } }<br>]; |

FIG. 17A

```
Option
        DuplexUnit=ON
        HardDisk=ON
        Memory=256MB
        OptionTray=ON
InputTray Tray1=A4
        Bypass=A5
```

FIG. 17B

```
OptionTray
        Tray2=B5
        b=A3
```

INFORMATION PROCESSING APPARATUS, INFORMATION PROCESSING SYSTEM, AND NON-TRANSITORY RECORDING MEDIUM STORING INSTRUCTIONS FOR EXECUTING AN INFORMATION PROCESSING METHOD

CROSS-REFERENCE TO RELATED APPLICATION

This patent application is based on and claims priority pursuant to 35 U.S.C. § 119(a) to Japanese Patent Application No. 2018-043628, filed on Mar. 9, 2018, in the Japan Patent Office, the entire disclosure of which is hereby incorporated by reference herein.

BACKGROUND

Technical Field

The present disclosure relates to an information processing apparatus, an information processing system, and a non-transitory recording medium storing instructions for executing an information processing method.

Background Art

In Windows (registered trademark) Operating System (OS) from Windows 2000 to Windows 7, a printer driver architecture called a Version 3 (hereinafter referred to as "V3") printer driver is adopted. In Windows 8 and later Windows OS, in addition to the V3 printer driver, a new printer driver architecture called a Version 4 (hereinafter referred to as "V4") printer driver is adopted.

The V4 printer driver provides a technique for implementing a plurality of functions such as obtaining device information while printing with an image forming apparatus connected via a universal serial bus (USB).

SUMMARY

Embodiments of the present disclosure described herein provide an information processing apparatus, system, and a non-transitory recording medium storing instructions for executing an information processing method. The information processing system includes the information processing apparatus with one or more printer drivers installed and an image forming apparatus connected to the information processing apparatus to perform bidirectional communication with the image forming apparatus in response to a request from at least one of the printer drivers, by setting control information in a storage area corresponding to the printer driver and requesting a communication control program to perform the bidirectional communication with the image forming apparatus based on control information set for the printer driver.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 8A to FIG. 8D are diagrams illustrating information managed by the information processing apparatus according to the first embodiment of the present disclosure;

FIG. 10 is a diagram illustrating a first example of a display screen according to the first embodiment of the present disclosure;

FIG. 15A to FIG. 15C are diagrams illustrating information managed by the information processing apparatus according to the second embodiment of the present disclosure;

FIG. 17A and FIG. 17B are diagrams illustrating device information according to the second embodiment of the present disclosure.

Figure 1:
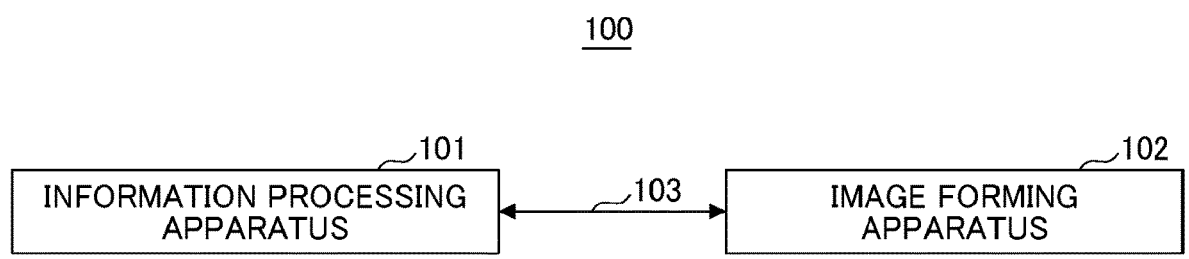
FIG. 1 is a diagram illustrating a system configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

A description is given of several embodiments of the present disclosure with reference to drawings.

[System Configuration]

FIG. 1 is a diagram illustrating a system configuration of an information processing system 100 according to a present embodiment. As illustrated in FIG. 1, the information processing system 100 includes an information processing apparatus 101 and an image forming apparatus 102. The information processing apparatus 101 and the image forming apparatus 102 are communicably connected via a USB cable 103.

Examples of the information processing apparatus 101 include information terminals such as a personal computer (PC), a tablet terminal, and a smartphone. The information processing apparatus 101 receives a print instruction from the user, creates print data from print target data, and transmits a print request to the image forming apparatus 102. The information processing apparatus 101 acquires device information including the configuration of the image forming apparatus 102 and options via the USB cable 103 and displays a print setting screen reflecting the information acquired from the image forming apparatus 102 on a display device of the information processing apparatus 101.

Examples of the print target data include printable electronic data such as image data and document data. The print data is electronic data obtained by converting the print target data into a format such as Page Description Language (PDL) that can be printed by the image forming apparatus 102.

Examples of the image forming apparatus 102 include an electronic apparatus having a printing function, such as a printer, or a multifunction peripheral (MFP) providing scanning, copying, printing, and facsimile capabilities and the like in a single housing. The image forming apparatus 102 prints the print data in response to the print request received from the information processing apparatus 101.

Figure 2B:
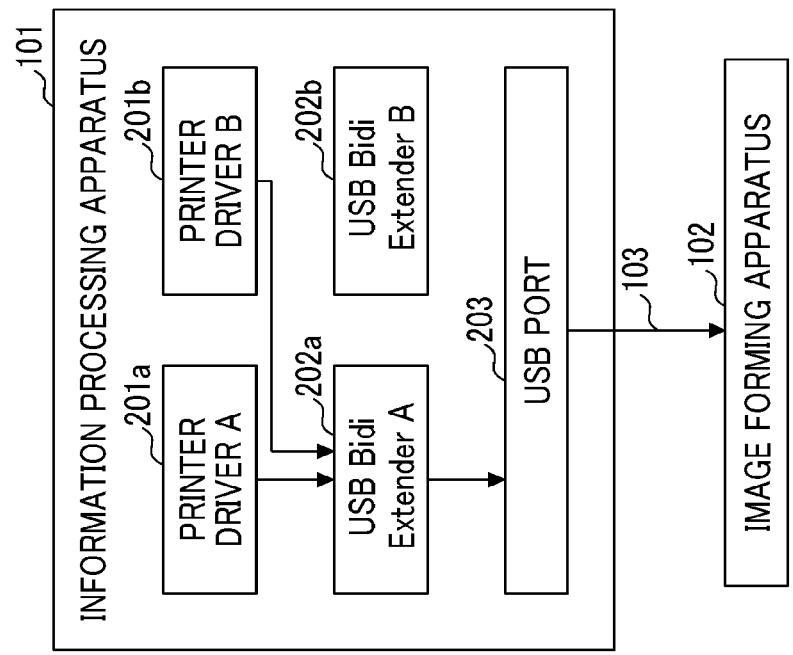
FIG. 2A and FIG. 2B are diagrams for describing a problem according to embodiments of the present disclosure.
Figure 2A:
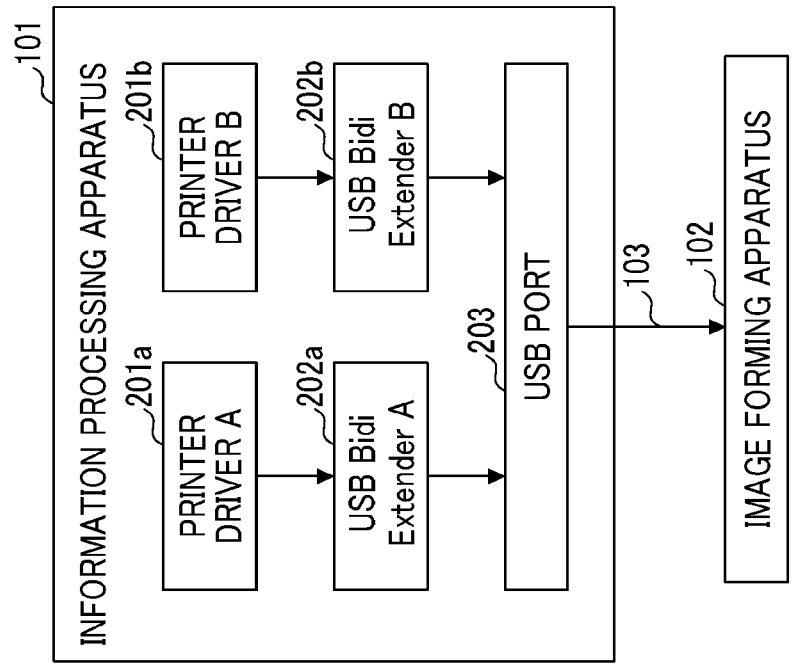

FIG. 2A and FIG. 2B are diagrams for describing a problem according to an embodiment of the present disclosure.

In Windows (registered trademark) Operating System (OS) from Windows 2000 to Windows 7, a printer driver architecture called a Version 3 (hereinafter referred to as "V3") printer driver is adopted. In Windows 8 and later Windows OS, in addition to the V3 printer driver, a new printer driver architecture called a Version 4 (hereinafter referred to as "V4") printer driver is adopted.

In the V3 printer driver, a language monitor is used to perform bidirectional communication via the USB interface. The language monitor communicates bidirectionally with the image forming apparatus 102 and acquires device information of the image forming apparatus 102. Also, the language monitor allowed vendors to install their own functions.

On the other hand, with the V4 printer driver, the language monitor has been discontinued and a USB Bidi Extender is introduced instead. In the USB Bidi Extender, vendors can customize only Bidi Extender JavaScript (registered trademark) and Bidi Extension Extensible Markup Language (XML). With the V4 printer driver, the information processing apparatus 101 communicates bidirectionally with the image forming apparatus 102 using the USB Bidi Extender.

For example, when the information processing apparatus 101 and the image forming apparatus 102 are connected by the USB cable 103, a USB port for the image forming apparatus 102 is created in the information processing apparatus 101 by the OS.

In addition, a plurality of printer drivers may be used for the created USB port. For example, the plurality of printer drivers corresponding to different file formats designating the same USB port may be installed in the information processing apparatus 101.

As described above, in the information processing apparatus 101 in which a plurality of printer drivers uses one USB port, the USB Bidi Extender included in the printer driver may not operate and the USB Bidi Extender of another printer driver may be used.

For example, as illustrated in FIG. 2A, it is assumed that the printer driver A 201a and the USB Bidi Extender A 202a corresponding to the printer driver A 201a are installed in the information processing apparatus 101. Further, it is assumed that the printer driver B 201b and the USB Bidi Extender B 202b corresponding to the printer driver B 201b are installed in the information processing apparatus 101. Further, it is assumed that the USB port 203 is designated for both the printer driver A 201a and the printer driver B 201b.

For example, when the printer driver A 201a communicates bidirectionally with the image forming apparatus 102, the printer driver A 201a preferably communicates bidirectionally with the image forming apparatus 102 via the USB Bidi Extender A 202a. Similarly, when the printer driver B 201b communicates bidirectionally with the image forming apparatus 102, the printer driver B 201b preferably communicates bidirectionally with the image forming apparatus 102 via the USB Bidi Extender B 202b.

However, in reality, only one USB Bidi Extender can be used and the user cannot designate the USB Bidi Extender to be used due to constraints of the OS or the like, as illustrated for example in FIG. 2B. In the example of FIG. 2B, since the printer driver B 201b cannot use the USB Bidi Extender B 202b, it is sometimes impossible to perform bidirectional communication correctly with the image forming apparatus 102.

Therefore, the information processing apparatus 101 according to the present embodiment defines only processes common to each printer driver in the USB Bidi Extender. For example, only processing for acquiring control information (for example, model information acquisition request) from a storage area corresponding to the printer driver (for example, a property bag) and sending it to the image forming apparatus 102 is defined in the USB Bidi Extender.

Further, the printer driver stores the control information in the storage area corresponding to the printer driver. Thus, the printer driver B 201b can correctly perform bidirectional communication even when the USB Bidi Extender A 202a is used as illustrated for example in FIG. 2B.

[Hardware Configuration]

An example of a hardware configuration of the information processing apparatus 101 and the image forming apparatus 102 included in the information processing system 100 according to the present embodiment is described.

Hardware Configuration of Information Processing Apparatus

Figure 3:
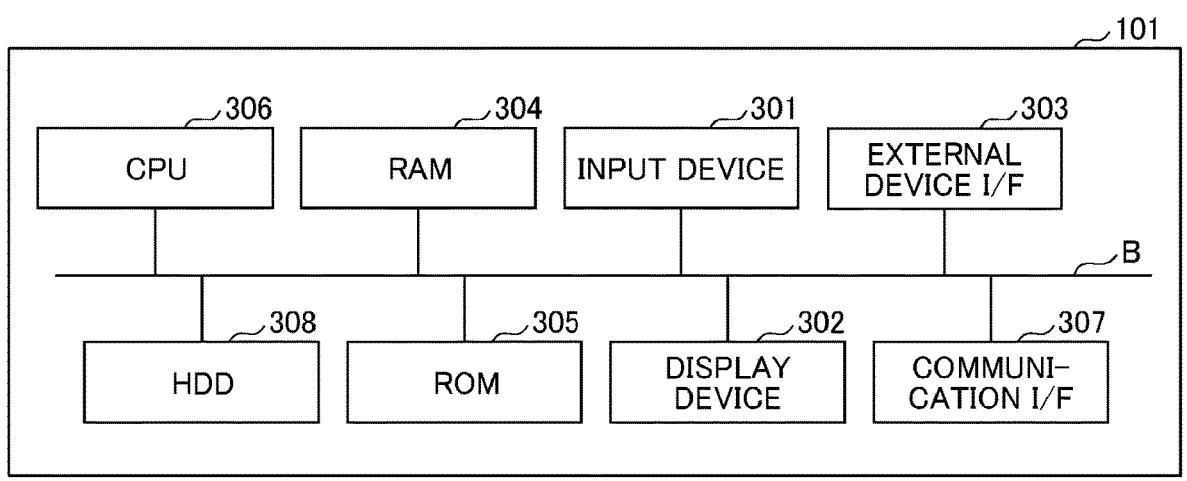
FIG. 3 is a block diagram illustrating a hardware configuration of an information processing apparatus according to embodiments of the present disclosure.

FIG. 3 is a block diagram illustrating a hardware configuration of the information processing apparatus 101 according to the present embodiment. As illustrated in FIG. 3, the information processing apparatus 101 according to the present embodiment includes an input device 301, a display device 302, an external device interface (I/F) 303, and a random access memory (RAM) 304. Further, the information processing apparatus 101 includes a read only memory (ROM) 305, a central processing unit (CPU) 306, a communication I/F 307, and a hard disk drive (HDD) 308. These hardware devices are connected to each other by a bus B.

The input device 301 includes a keyboard, a mouse, a touch panel, and the like to enable the user to input various operation signals. The display device 302 includes a display and the like and displays the processing result produced by the information processing apparatus 101. Note that at least one of the input device 301 and the display device 302 may be connected to the information processing apparatus 101 for use when necessary.

The communication I/F 307 is an interface for connecting the information processing apparatus 101 to a network.

The HDD 308 is a nonvolatile storage device that stores programs and data. Examples of the programs or data stored in the HDD 308 include an operating system (OS) for controlling an entire operation of the information processing apparatus 101 and an application program providing various functions on the OS.

The information processing apparatus 101 may include, as an alternative to the HDD 308, a drive device such as a solid state drive (SSD) that uses a flash memory as a storage medium. The HDD 308 manages stored programs and data using a predetermined file system or a database (DB).

The external device I/F 303 is an interface such as the USB for connecting an external device to the information processing apparatus 101. For example, the information processing apparatus 101 can connect the image forming apparatus 102 to the information processing apparatus 101 by using the USB cable 103 connected to the external device I/F 303.

The ROM 305 is a nonvolatile semiconductor memory capable of holding programs and data even when the power is turned off. The ROM 305 stores programs and data such as OS settings, network settings, and the like, and a basic input/output system (BIOS) executed when the information processing apparatus 101 is activated. The RAM 304 is a volatile semiconductor memory that temporarily holds programs and data.

The CPU 306 loads programs or data from the storage device such as the ROM 305 and the HDD 308 onto the RAM 304 and executes processes to implement entire control and functions of the information processing apparatus 101.

The hardware configuration illustrated in FIG. 3 allows the information processing apparatus 101 according to the present embodiment to implement various kinds of processes as described below.

Hardware Configuration of Image Forming Apparatus

Figure 4:
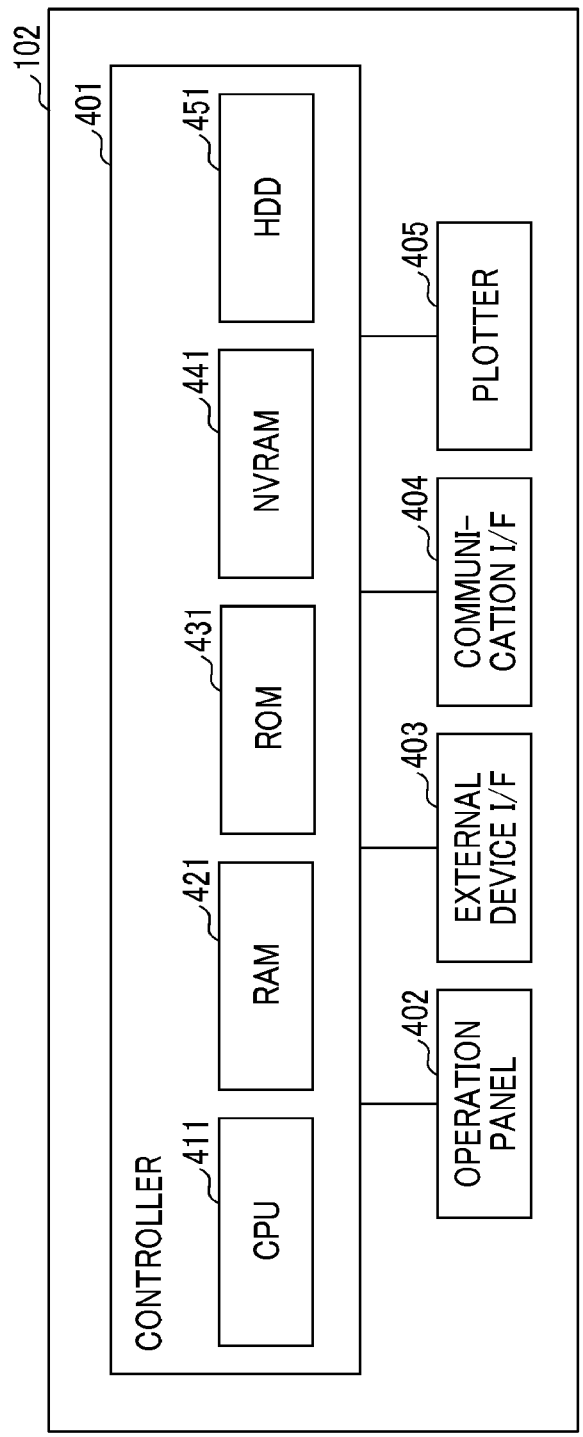
FIG. 4 is a block diagram illustrating a hardware configuration of an image forming apparatus according to embodiments of the present disclosure.

FIG. 4 is a block diagram illustrating a hardware configuration of the image forming apparatus 102 according to embodiments of the present disclosure.

As illustrated in FIG. 4, the image forming apparatus 102 according to the present embodiment includes a controller 401, an operation panel 402, an external device I/F 403, a communication I/F 404, and a plotter 405. Further, the controller 401 includes a CPU 411, a RAM 421, a ROM 431, a non-volatile random-access memory (NVRAM) 441, and an HDD 451.

The ROM 431 is a nonvolatile memory that stores various programs and data. The RAM 421 is a volatile memory that temporarily holds programs and data. The NVRAM 441 stores setting information and the like, for example. The HDD 451 is a nonvolatile storage device that stores various programs and data.

The CPU 411 loads programs, data, or setting information from the storage device such as the ROM 431, the NVRAM 441 and the HDD 451 onto the RAM 421 and executes processes to implement entire control and functions of the image forming apparatus 102.

The operation panel 402 includes an input device that accepts input from the user and a display device that performs display.

The external device I/F 403 is, for example, an interface such as the USB for connecting the external device to the image forming apparatus 102. For example, the image forming apparatus 102 can connect the image forming apparatus 102 to the information processing apparatus 101 by using the USB cable 103 connected to the external device I/F 403.

The communication I/F 404 is an interface for connecting the image forming apparatus 102 to the network.

The hardware configuration illustrated in FIG. 4 allows the image forming apparatus 102 according to the present embodiment to implement various kinds of processes as described below.

[Functional Configuration of Information Processing Apparatus]

Figure 5:
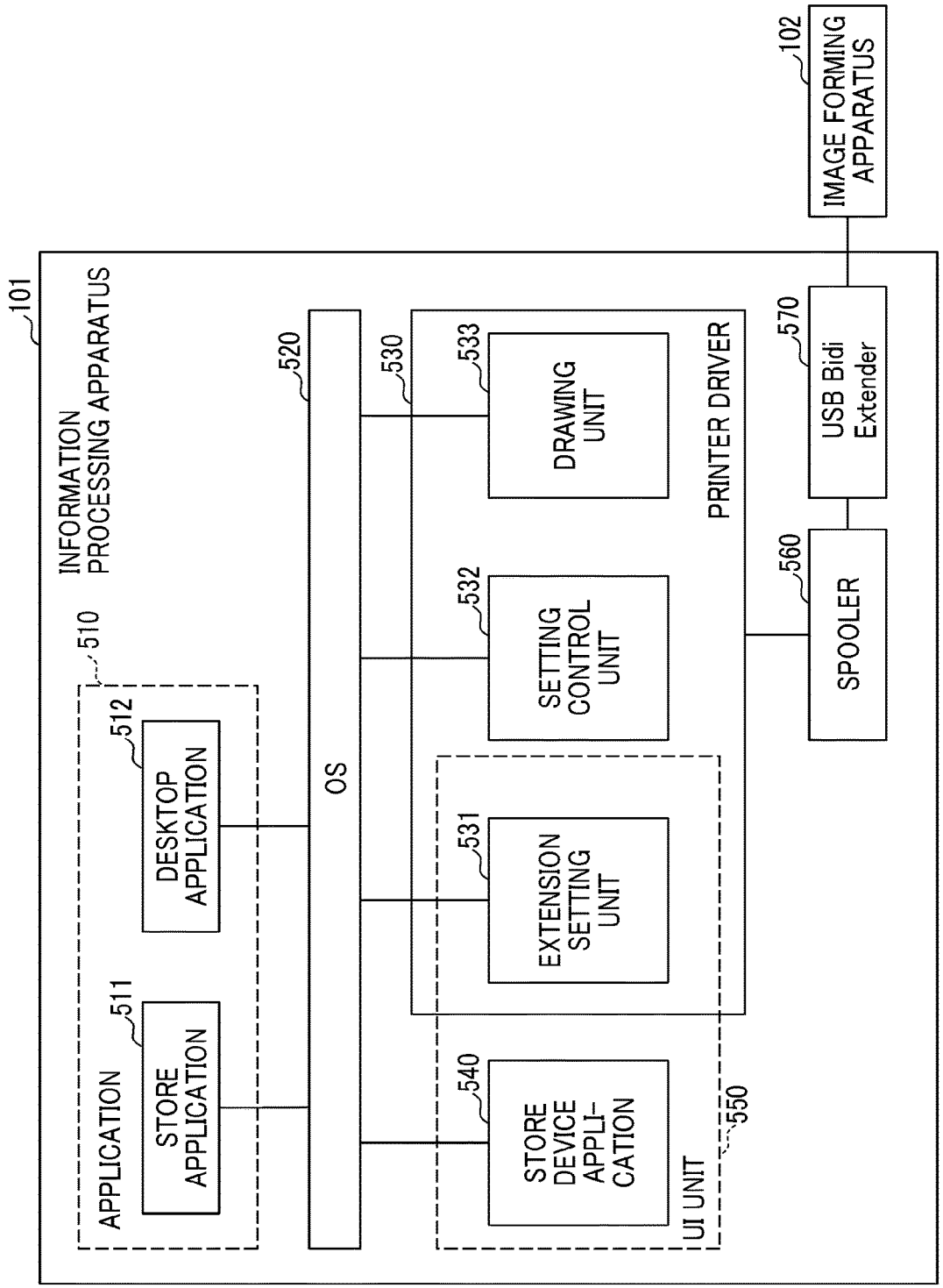
FIG. 5 is a block diagram illustrating a functional configuration of the information processing apparatus according to embodiments of the present disclosure.

The functional configuration of the information processing apparatus 101 according to the present embodiment is described with reference to FIG. 5. FIG. 5 is a block diagram illustrating an example of a functional configuration of the information processing apparatus.

As illustrated in FIG. 5, the information processing apparatus 101 according to the present embodiment includes an application 510, an OS 520, a printer driver 530, and a store device application 540.

The application 510 is an application program that can issue an instruction (request) for printing to the OS 520 in response to a user's print instruction, such as document creation software, image viewing/editing software, a browser, and the like. The application 510 includes a store application 511 and a desktop application 512.

The store application 511 is an application that can be obtained from, for example, "Windows Store" that provides applications to Windows (registered trademark) 8/Windows RT and subsequent versions of Windows OS. In the store application 511, a store application user interface (UI) is used. In Windows 8 and Windows 8.1, the store application 511 is called from the UI also called "Modern UI" or "Metro UI" provided by the OS 520.

On the other hand, the desktop application 512 is an application that can be used also in, for example, Windows 7 or earlier versions.

The OS 520 is Windows 8/Windows RT or later versions of Windows OS.

The printer driver 530 is a program for controlling printing. In the present embodiment, the printer driver 530 is the aforementioned V4 printer driver. The printer driver 530 includes an extension setting unit 531, a setting control unit 532, and a drawing unit 533.

The extension setting unit 531 is also referred to as a printer extension. When printing is performed from the desktop application 512, the extension setting unit 531 displays a customized print setting screen or the like.

The setting control unit 532 is also called a prohibition script, and verifies, for example, whether or not a combination of print settings is valid. For example, the extension setting unit 531 can hide a combination of print settings verified by the setting control unit 532 to be invalid or return to the default setting.

In response to a request from the application 510, the OS 520, or the like, the setting control unit 532 returns Print Capability, which is setting capability information indicating those functions that are settable by the printer driver 530. Further, in response to a request from the application 510, the OS 520, or the like, the setting control unit 532 acquires setting values of various functions set in the printer driver 530 from Devmode Property Bag and returns PrintTicket indicating the acquired setting value. In addition, the setting control unit 532 saves the setting value indicated by PrintTicket in DevmodePropertyBag.

Note that PrintCapability and PrintTicket returned to the OS 520 are used, for example, to display the current value of each function, options, and the like on the print setting screen displayed by the extension setting unit 531.

The drawing unit 533 creates print data from the print target data on which the print instruction is made in the application 510.

When printing is instructed from the store application 511, the store device application 540 displays the customized print setting screen or the like. Note that the store device application 540 is an application that can be obtained from the "Windows store" like the store application 511.

When printing is instructed from the desktop application 512, the printer driver 530 can generate print data based on the print settings on the print setting screen displayed by the extension setting unit 531. On the other hand, when printing is instructed from the store application 511, the printer driver 530 can generate print data based on the print settings on the print setting screen displayed by the store device application 540.

The extension setting unit 531 and the store device application 540 constitute a UI unit 550 for displaying the customized print setting screen.

The spooler 560 is a module provided by the OS 520 or the like. The spooler 560 temporarily stores the print data generated by the printer driver 530, and sequentially transmits the print data to the image forming apparatus 102 using the USB Bidi Extender 570.

The USB Bidi Extender 570 includes JavaScript (USB Bidi JavaScript) called by the spooler 560 and controls the bidirectional communication with the image forming apparatus 102. In this disclosure, the USB Bidi Extender 570 is an example of a communication control program.

[Storage Area Accessible by V4 Printer Driver 530 and Store Device Application 540]

A storage area accessible by the V4 printer driver 530 and the store device application 540 is described with reference to FIG. 6.

Figure 6:
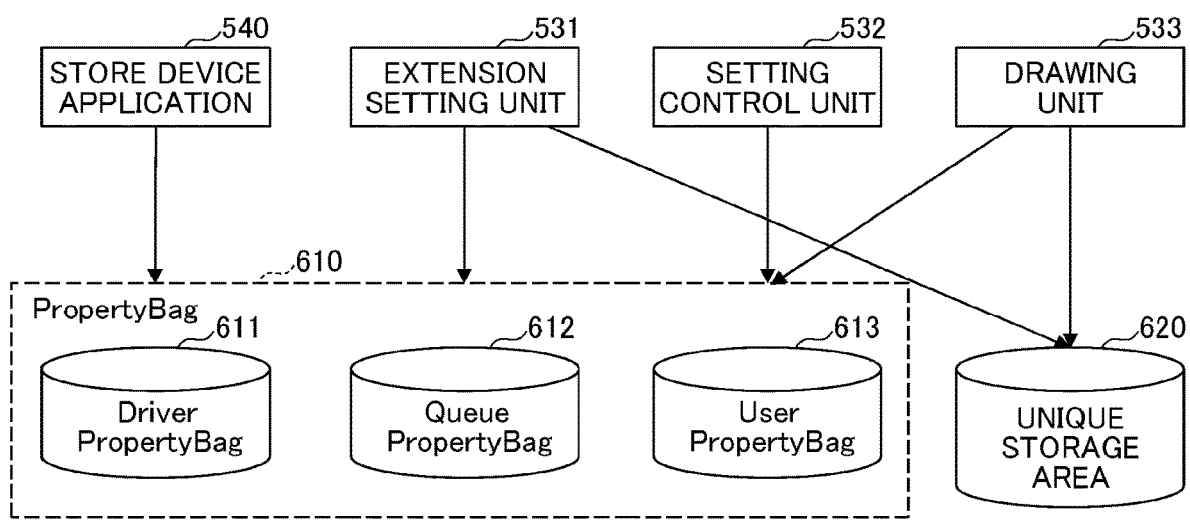
FIG. 6 is a diagram for describing a storage area accessible by a V4 printer driver and a store device application.

As illustrated in FIG. 6, the extension setting unit 531, the setting control unit 532, the drawing unit 533, and the store device application 540 can access a storage area called Property Bag 610. Note that such access to the storage area can be performed using an application program interface (API) provided by the OS 520.

As illustrated in FIG. 6, the Property Bag 610 includes a Driver Property Bag 611, a Queue Property Bag 612, and a User Property Bag 613.

The Driver Property Bag 611 is a storage area for storing configuration information and the like determined when the V4 printer driver 530 is created. The extension setting unit 531, the setting control unit 532, the drawing unit 533, and the store device application 540 can read various information from the Driver Property Bag 611. On the other hand, the extension setting unit 531, the setting control unit 532, the drawing unit 533, and the store device application 540 cannot write information to the Driver Property Bag 611.

The Queue Property Bag 612 is a storage area for storing setting information and the like for each logical printer (printer icon). The extension setting unit 531 and the store device application 540 can read from and write various kinds of information to the Queue Property Bag 612. In addition, the setting control unit 532 and the drawing unit 533 can read various kinds of information from the Queue Property Bag 612. Further, the information stored in the Queue Property Bag 612 can also be read from the above-described USB Bidi Extender.

Note that the logical printer is, for example, a virtual printer displayed as a printer icon in a printer folder or the like of the OS 520. A user of the information processing apparatus 101 can create a plurality of logical printers having different setting information (for example, paper size, paper orientation, print quality, etc.) for one image forming apparatus 102.

The User Property Bag 613 is a storage area for storing setting information and the like for each user for each logical printer. The extension setting unit 531, the setting control unit 532, and the store device application 540 are capable of reading and writing various information from and to the User Property Bag 613.

Further, the extension setting unit 531 and the drawing unit 533 can read and write various kinds of information in and from a unique storage area 620.

The unique storage area 620 is implemented by using, for example, a registry, a file, or the like, and is a storage area different from the Property Bag 610. The unique storage area 620 is defined by, for example, the vendor providing the V4 printer driver 530 or the like.

The store device application 540 cannot access any storage area other than the Property Bag 610 due to constraints imposed by the OS 520. Further, the setting control unit 532 cannot access any storage areas other than the Devmode Property Bag and the Property Bag 610 described above. That is, the store device application 540 and the setting control unit 532 cannot read or write various information from or to the unique storage area 620.

This is the same as the constraint imposed on the store application 511, and is meant to prevent, for example, the store device application 540 and the setting control unit 532 from changing the registry, etc., used by the OS 520 and adversely affecting the operation of the OS 520. Such a technique is called "sandboxing".

First Embodiment

Hereinafter, a functional configuration of the information processing apparatus according to a first embodiment is described.

Functional Configuration

Figure 7:
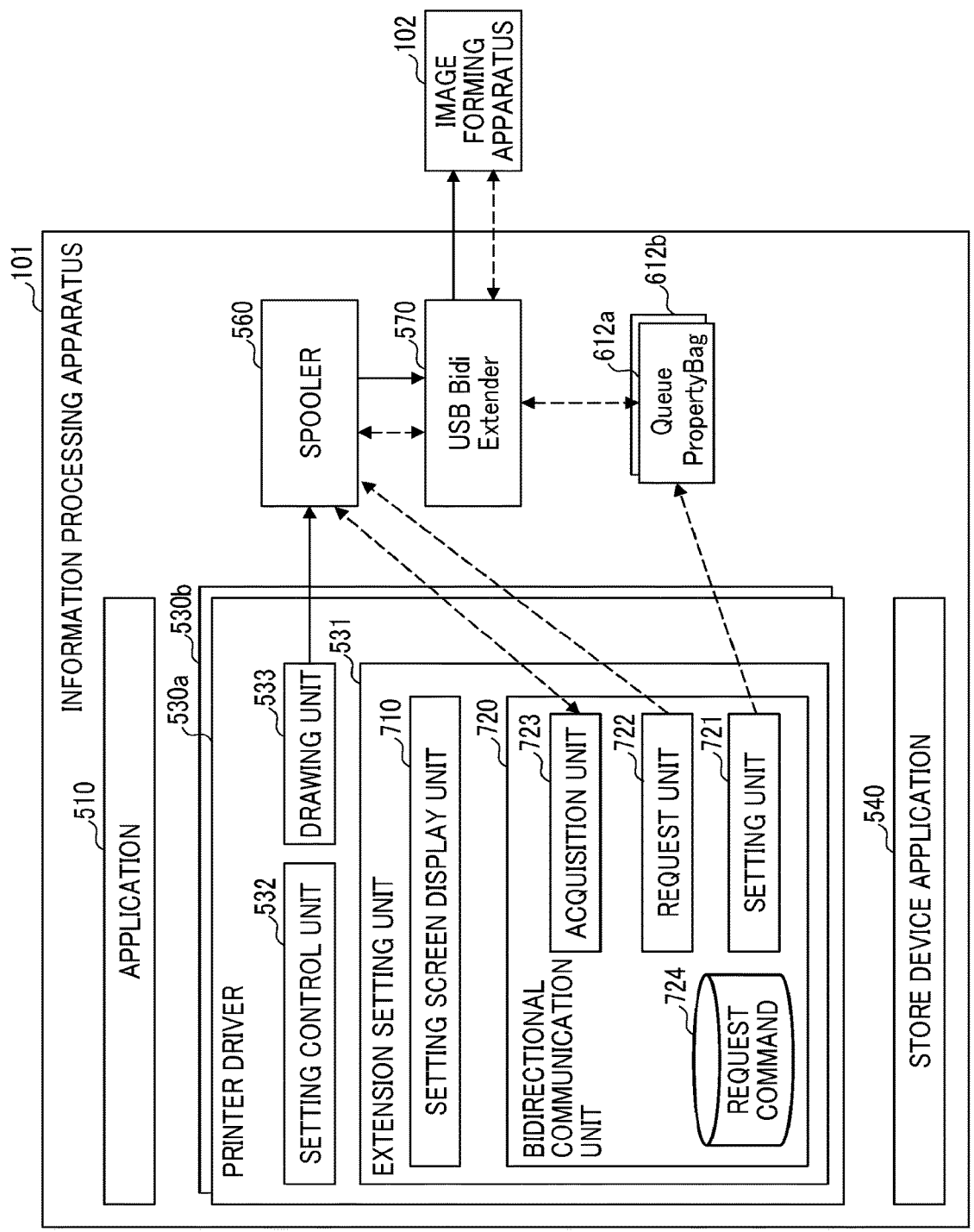
FIG. 7 is a block diagram illustrating a functional configuration of the information processing apparatus according to a first embodiment of the present disclosure.

FIG. 7 is a block diagram illustrating a functional configuration of the information processing apparatus 101 according to the first embodiment of the present disclosure.

In the information processing apparatus 101, for example, programs such as the application 510, one or more printer drivers 530a and 530b, the store device application 540, and the like are installed.

The information processing apparatus 101 implements the Queue Property Bags 612a and 612b and the spooler 560 and the like which are storage areas corresponding to each of one or more printer drivers 530a and 530b by executing the OS 520 in the CPU 306.

In FIG. 7, it is assumed that the printer driver 530b has the same functional configuration as that of the printer driver 530a. In the following description, "printer driver 530" is used to indicate any one of the one or more printer drivers 530a and 530b. Likewise, the Queue Property Bag 612 is used to indicate any one of the Queue Property Bags among the Queue Property Bags 612a and 612b.

The information processing apparatus 101 implements the extension setting unit 531, the setting control unit 532, and the drawing unit 533 described with reference to FIG. 5 by executing the printer driver 530 by the CPU 306.

Further, the extension setting unit 531 according to the present embodiment includes a setting screen display unit 710 and a bidirectional communication unit 720.

Using the device information of the image forming apparatus 102 acquired by the bidirectional communication unit 720, the setting screen display unit 710 causes the display unit of the display device 302 or the like to display a print setting screen.

The bidirectional communication unit 720 includes a setting unit 721, a request unit 722, an acquisition unit 723, and the like, and acquires the device information of the image forming apparatus 102 from the image forming apparatus 102 via the spooler 560 and the USB Bidi Extender 570.

The setting unit 721 sets (stores) the control information for performing bidirectional communication with the image forming apparatus 102 in the storage such as the Queue Property Bag 612 corresponding to the printer driver 530. The bidirectional communication unit 720 stores a request command 724 such as a request to acquire device information for requesting, for example, the image forming apparatus 102 to acquire device information. Further, the setting unit 721 sets the request command 724 in the Queue Property Bag 612 corresponding to the printer driver 530.

For example, the setting unit 721 of the printer driver 530a sets the request command 724 corresponding to the printer driver 530a in the Queue Property Bag 612a corresponding to the printer driver 530a. Similarly, the setting unit 721 of the printer driver 530b sets the request command 724 corresponding to the printer driver 530b in the Queue Property Bag 612b corresponding to the printer driver 530b.

FIG. 8A illustrates an example image of the request command 724. In the request command 724 as illustrated for example in FIG. 8A, one or more request commands to be transmitted to the image forming apparatus 102 are stored. Note that although FIG. 8A illustrates an example in which the request command is a character string, the request command is not limited to the character string and may be binary data or the like, for example.

FIG. 8B illustrates an example of the request command 724 to be stored in the Queue Property Bag 612. When the setting unit 721 sets the request command in the Queue Property Bag 612 as illustrated for example in FIG. 8B, a request command key and a value corresponding to the request command are set as a pair.

When the USB Bidi Extender 570 reads the request command from the Queue Property Bag 612, the USB Bidi Extender 570 designates the request command key and read the value corresponding to the request command key.

In the present embodiment, it is assumed that the format, content, or the like of the request command differs for each printer driver.

The request unit 722 transmits an execution request for requesting execution of bidirectional communication with the image forming apparatus 102 to the USB Bidi Extender 570 via the spooler 560. The execution request includes, for example, information necessary for acquiring the request command 724 stored in the Queue Property Bag 612 such as the request command key.

The USB Bidi Extender 570 according to the present embodiment acquires the request command stored in the Queue Property Bag 612a, for example, in response to the execution request from the request unit 722 of the printer driver 530a and transmits the request command to the image forming apparatus 102. Similarly, the USB Bidi Extender 570 acquires the request command stored in the Queue Property Bag 612b, for example, in response to the request from the request unit 722 of the printer driver 530b and transmits the request command to the image forming apparatus 102.

The acquisition unit 723 acquires the device information of the image forming apparatus 102 acquired by the USB Bidi Extender 570 via the spooler 560.

FIG. 8C illustrates an example of the device information 801 acquired from the image forming apparatus 102 by the acquisition unit 723. For example, in response to the request command "@ PJL INFO OPTION" in FIG. 8A, the information of "Option" of the device information 801 is acquired, and in response to the request command "@ PJL INFO TRAY", the device information 801 "InputTray" is acquired.

In the example of FIG. 8C, a duplex unit, an HDD, and a memory of 256 MB are indicated as the options mounted on the image forming apparatus 102. Further, as information on the tray, the image forming apparatus 102 includes a tray 1 and a manual sheet feeding tray, the paper size of the tray 1 is A4, and the paper size of the manual sheet feeding tray is A5 as indicated for example in FIG. 8C.

In this manner, the USB Bidi Extender 570 according to the present embodiment executes a process common to each printer driver 530, which is to acquire the request command from the Queue Property Bag 612, transmit the request command to the image forming apparatus 102, and acquire the device information.

Therefore, for example, as described with reference to FIG. 2, even when the printer driver 530b uses the USB Bidi Extender 570 for the printer driver 530a, bidirectional communication with the image forming apparatus 102 can be performed without a problem.

Processing Flow

Processing flow of the information processing method according to the present embodiment is described below.

(Processing of Information Processing System 1)

Figure 9:
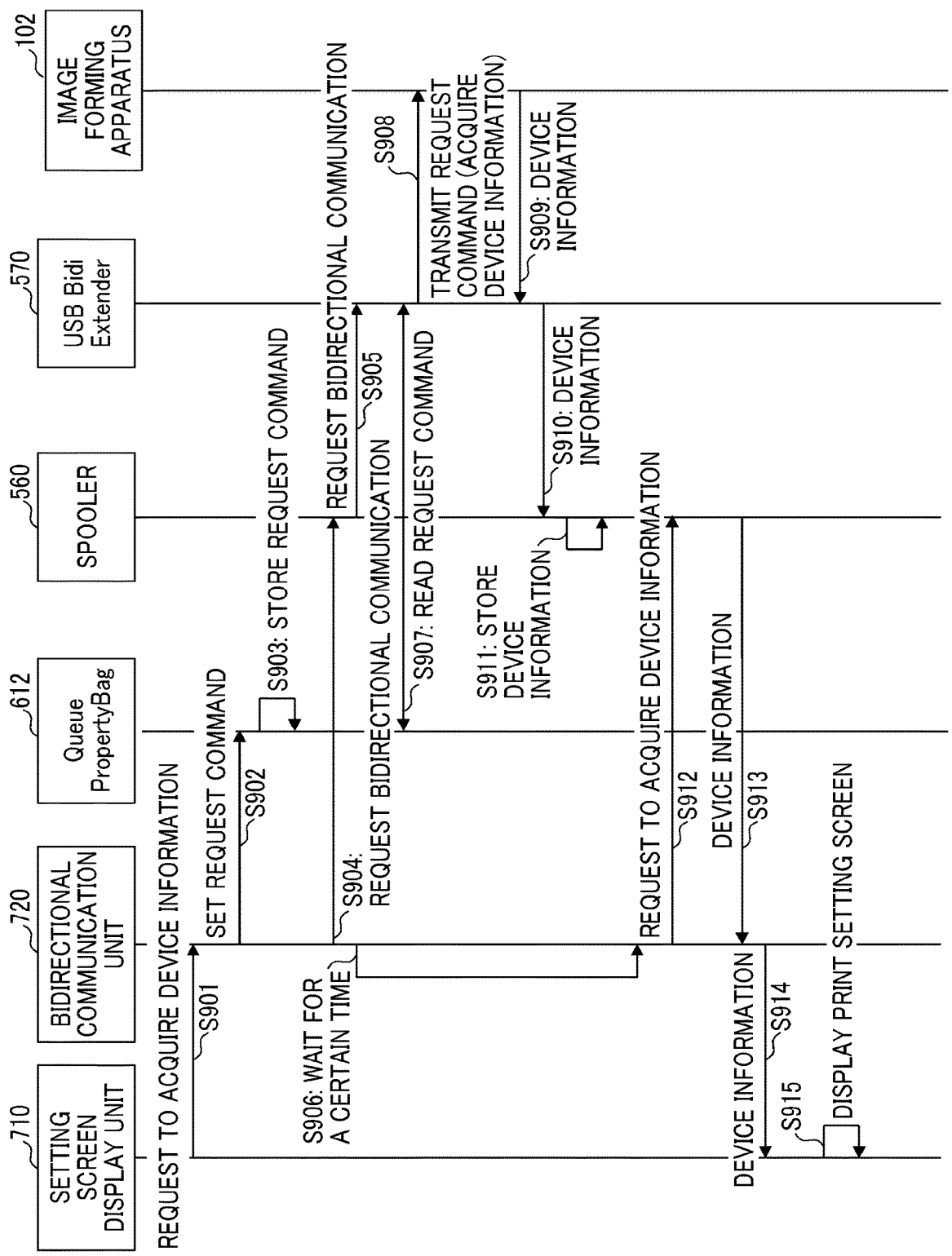
FIG. 9 is a sequence diagram illustrating processing by the information processing system according to the first embodiment of the present disclosure.

FIG. 9 is a sequence diagram illustrating an example of processing executed by the information processing system 1 according to the first embodiment. In particular, FIG. 9 illustrates an example of processing when the setting screen display unit 710 of the printer driver 530 displays the print setting screen reflecting the device information of the image forming apparatus 102.

In step S901, the setting screen display unit 710 of the printer driver 530 requests the bidirectional communication unit 720 to acquire the device information of the image forming apparatus 102 connected to the information processing apparatus 101.

In steps S902 and S903, the setting unit 721 of the bidirectional communication unit 720 stores the request command 724 corresponding to the printer driver 530 in the Queue Property Bag 612 corresponding to the printer driver 530. It is assumed that the request command 724 is stored in the Queue Property Bag 612 as illustrated for example in FIG. 8B.

In steps S904 and S905, the request unit 722 of the bidirectional communication unit 720 requests bidirectional communication to the USB Bidi Extender 570 via the spooler 560. The request for bidirectional communication includes the request command key "Bidi Request Command" as illustrated for example in FIG. 8B.

In step S906, the bidirectional communication unit 720 waits for a certain length of time until the processing of the USB Bidi Extender 570 is completed.

In step S907, the USB Bidi Extender 570 reads the request command from the Queue Property Bag 612 using the request command key included in the request for bidirectional communication.

In step S908, the USB Bidi Extender 570 transmits to the image forming apparatus 102 the request command that requests the image forming apparatus 102 to acquire the device information.

In step S909, the USB Bidi Extender 570 acquires the device information transmitted from the image forming apparatus 102 according to the request command. It is assumed that the device information 801 as illustrated for example in FIG. 8C is acquired.

In step S910, the USB Bidi Extender 570 transmits the acquired device information 801 to the spooler 560. In step S911, the spooler 560 stores the notified device information 801 in a cache in the spooler 560.

In steps S912 and S913, upon completion of waiting for the certain length of time, the acquisition unit 723 of the bidirectional communication unit 720 requests and acquires from the spooler 560, the device information 801 acquired by bidirectional communication.

In step S914, the bidirectional communication unit 720 notifies the setting screen display unit 710 of the acquired device information 801.

In step S915, the setting screen display unit 710 displays the print setting screen reflecting the acquired device information 801 on the display unit such as the display device 302.

(Example of Display Screen)

Figure 11:
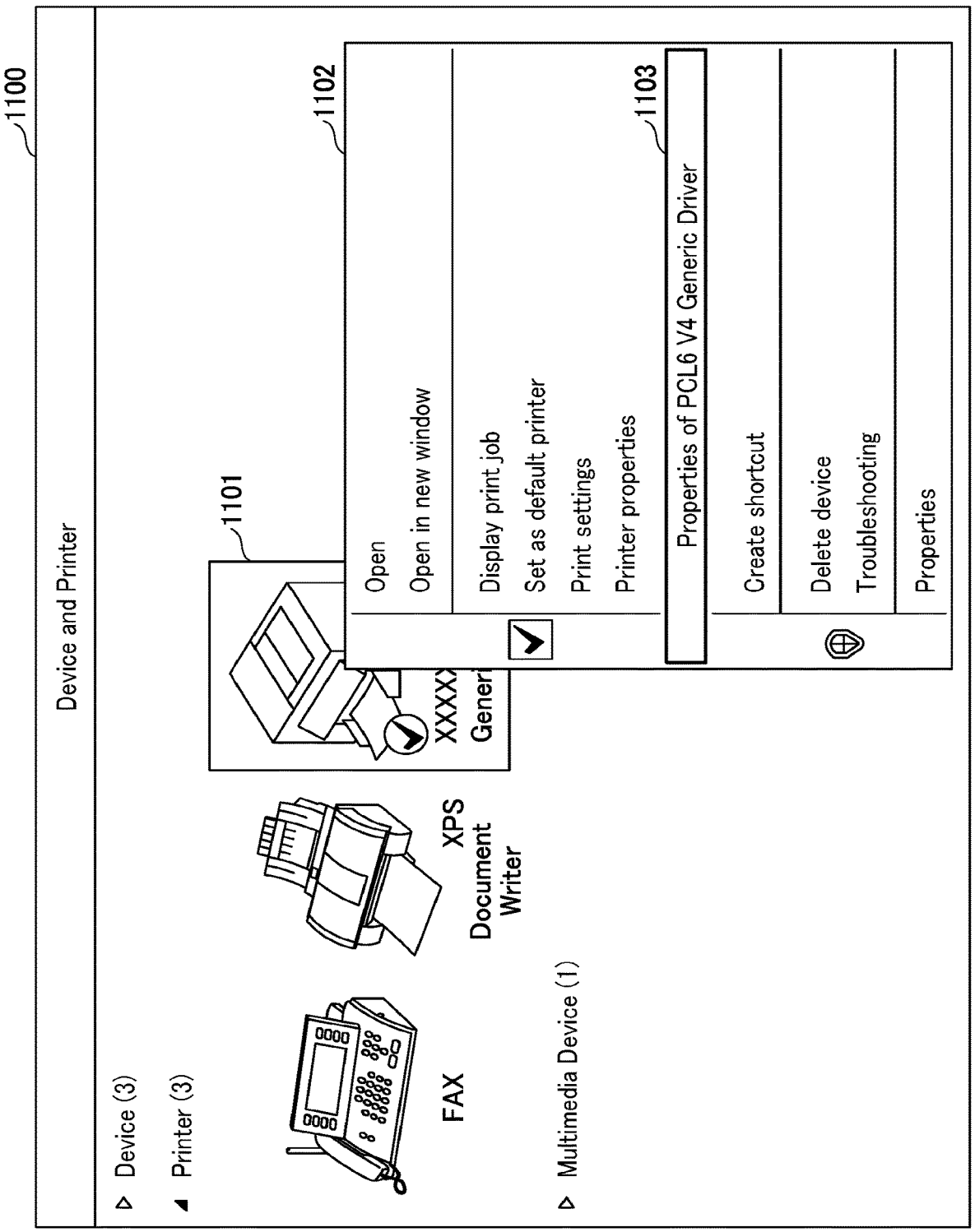
FIG. 11 is a diagram illustrating a second example of the display screen according to the first embodiment of the present disclosure.
Figure 12:
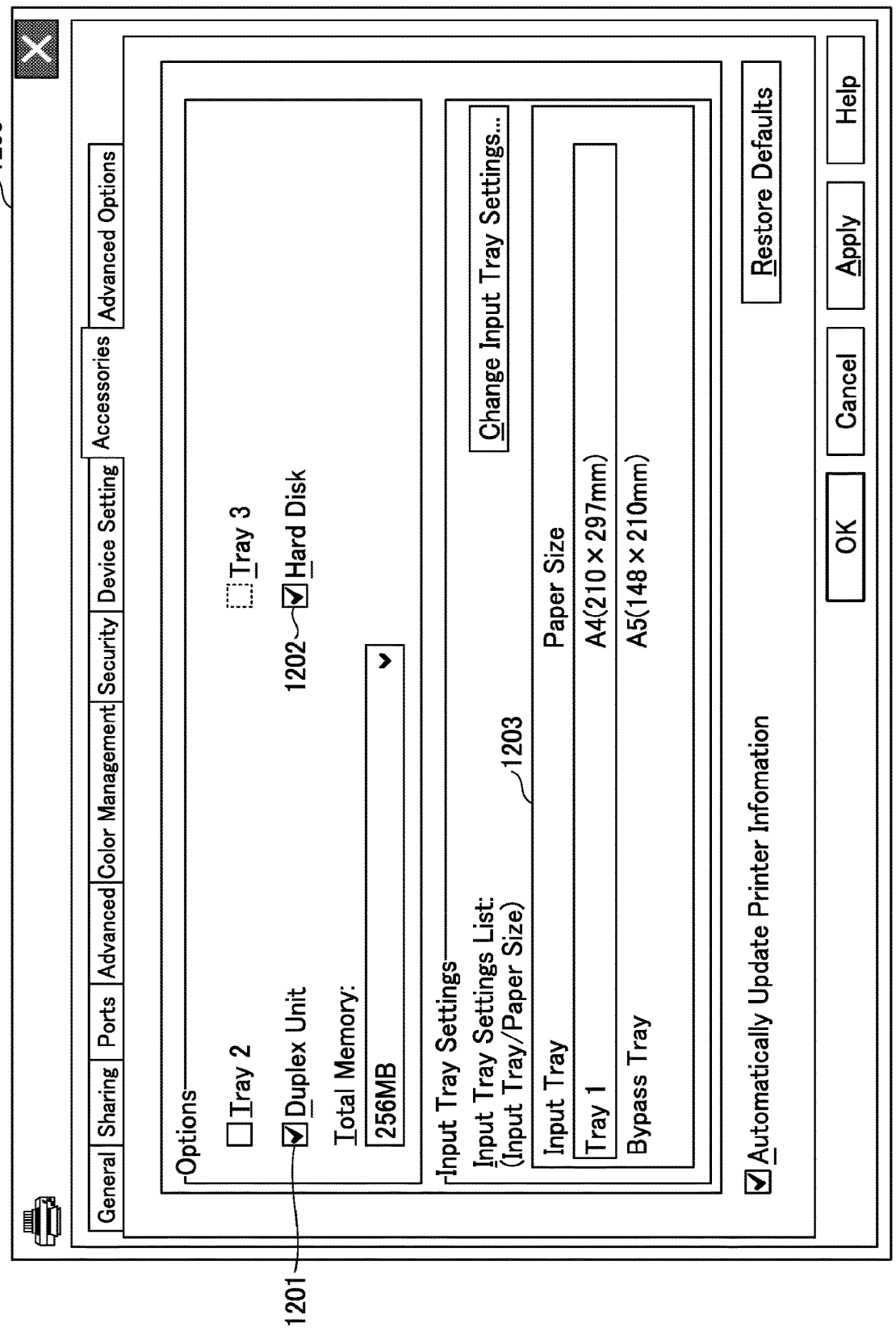
FIG. 12 is a diagram illustrating a third example of the display screen according to the first embodiment of the present disclosure.

FIGS. 10 to 12 are diagrams illustrating examples of display screens according to the first embodiment of the present disclosure.

FIG. 10 illustrates an example of the print setting screen 1000 displayed by the setting screen display unit 710 of the printer driver 530. For example, when the user selects a printer properties button 1001 on the print setting screen 1000, the processing illustrated in FIG. 9 is started.

The print setting screen 1000 illustrated in FIG. 10 is displayed, for example, when the user opens the print setting screen of the printer driver 530 in order to change the print setting when executing printing, or the like. Further, the print setting screen 1000 illustrated in FIG. 10 is displayed, for example, when the user opens the print setting screen from a menu of a printer icon in order to change a standard print setting.

FIG. 11 illustrates an example of a display screen 1100 for displaying a list of printer icons (logical printers) by the OS. For example, the process illustrated in FIG. 9 is started by the user selecting to view properties 1103 of a printer driver from a menu 1102 displayed by right-clicking on a printer icon 1101 from the list of printer icons.

FIG. 12 illustrates an example of the print setting screen displayed in step S915 of FIG. 9. In the print setting screen 1200 illustrated in FIG. 12 the device information 801 as illustrated for example in FIG. 8C is reflected and a check box 1201 indicating that a duplex unit is mounted and a check box 1202 indicating that an HDD is mounted are checked. Further, as an input tray information 1203, the image forming apparatus 102 includes the tray 1 and the manual sheet feeding tray, and the paper size of the tray 1 is A4, the paper size of the manual sheet feeding tray is A5, and the like are displayed.

(Processing of Information Processing System 2)

Figure 13:
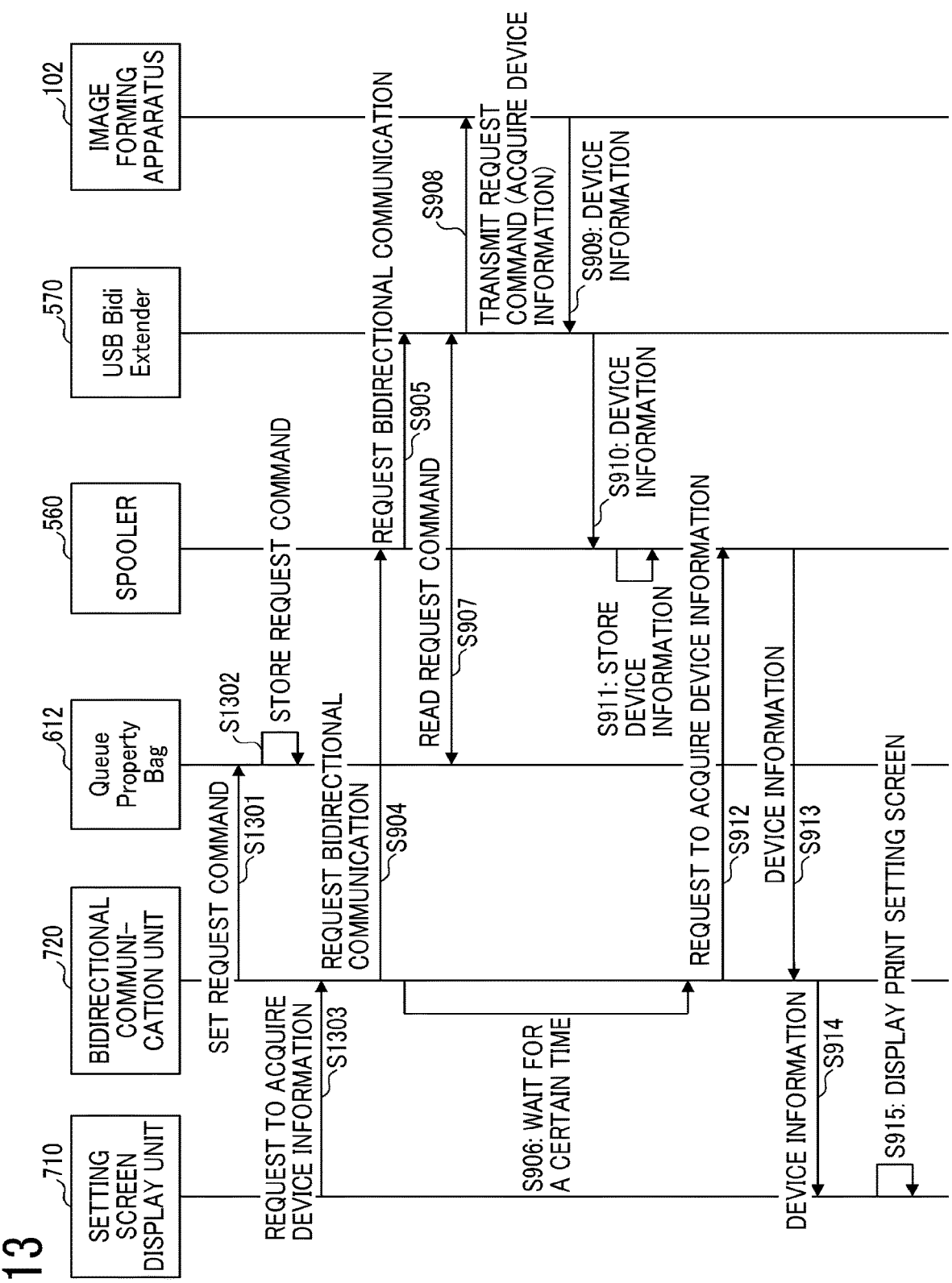
FIG. 13 is a sequence diagram illustrating another processing by the information processing system according to the first embodiment of the present disclosure.

FIG. 13 illustrates another example of the process of the information processing system according to the first embodiment. In the processing illustrated in FIG. 9, the setting unit 721 of the printer driver 530 sets the request command 724 in the Queue Property Bag 612 each time the setting screen display unit 710 requests acquisition of the device information.

However, as in the process illustrated in FIG. 13, the setting unit 721 may set the request command 724 in the Queue Property Bag 612 before receiving the acquisition request of the device information from the setting screen display unit 710.

Note that steps S904 to S915 are the same as the processes illustrated in FIG. 9. Accordingly, only the differences from the process illustrated in FIG. 9 are described below.

In steps S1301 and S1302, the setting unit 721 of the bidirectional communication unit 720 sets the request command 724 in the Queue Property Bag 612 before receiving the device information acquisition request from the setting screen display unit 710 in step S1303. As a result, the processing in steps S902 and S903 in FIG. 9 are omitted in the subsequent processing.

Thus, for example, when the request command 724 set in the Queue Property Bag 612 by the setting unit 721 has the same content each time, processing can be executed efficiently by the processing illustrated in FIG. 13.

In the above description, it is assumed that the setting unit 721 of the printer driver 530 sets the request command 724 in the Queue Property Bag 612 corresponding to the printer driver 530. Since the Queue Property Bag 612 is the storage area for each logical printer as described above, the request commands 724 of the plurality of printer drivers 530 are not repeatedly stored.

However, the storage area in which the setting unit 721 of the printer driver 530 sets the request command 724 may be a storage area other than the Queue Property Bag 612, for example, the unique storage area 620 in FIG. 6 or the like.

In this case, the setting unit 721 of each printer driver 530, for example, as illustrated in FIG. 8D, stores the request command 724 in the unique storage area 620 or the like using a different request command key for each printer driver 530.

For example, the setting unit 721 of the printer driver 530a stores the request command 724 in the unique storage area 620 or the like in association with the request command key "BidiRequestCommand 1". Further, the request unit 722 of the printer driver 530a transmits the request for bidirectional communication including the request command key "BidiRequestCommand 1" to the USB Bidi Extender 570 via the spooler 560.

Similarly, the setting unit 721 of the printer driver 530b stores the request command 724 in the unique storage area 620 or the like in association with the request command key "BidiRequestCommand 2". Further, the request unit 722 of the printer driver 530b transmits the request for bidirectional communication including the request command key "BidiRequestCommand 2" to the USB Bidi Extender 570 via the spooler 560.

As a result, the unique storage area 620 functions as the storage corresponding to each of the printer drivers 530.

Second Embodiment

In the first embodiment, it is assumed that the setting unit 721 of the printer driver 530 sets the request command 724 in the storage area such as the Queue Property Bag 612, for example. However, in addition to the request command 724, the setting unit 721 of the printer driver 530 may further set information such as a transmission condition 1401 in the storage area such as the Queue Property Bag 612.

In the second embodiment, an example of processing in a case in which the setting unit 721 of the printer driver 530 sets the request command and the transmission condition is described.

Functional Configuration

Figure 14:
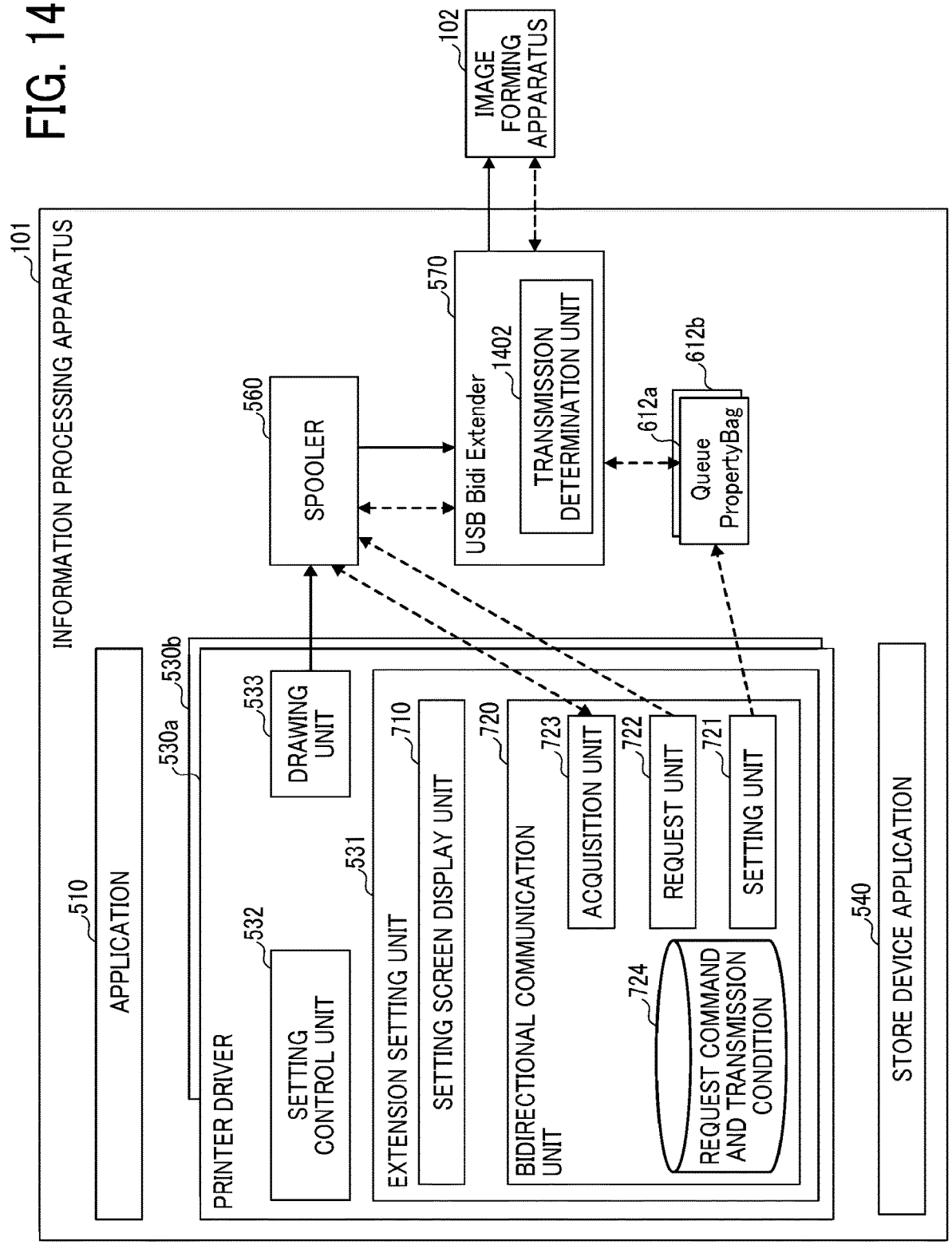
FIG. 14 is a block diagram illustrating a functional configuration of the information processing apparatus according to a second embodiment of the present disclosure.

FIG. 14 is a block diagram illustrating an example of a functional configuration of the information processing apparatus according to the second embodiment. The bidirectional communication unit 720 of the printer driver 530 illustrated in FIG. 14 stores a request command and a transmission condition 1401 as illustrated for example in FIG. 15A in advance, instead of the request command 724 according to the first embodiment illustrated in FIG. 7.

FIG. 15A illustrates an example of the request command and the transmission condition 1401. In FIG. 15A, the transmission condition "True" indicates that the corresponding request command is always transmitted. In addition, the transmission condition "If (Option Tray ON)" indicates that the corresponding request command is transmitted when the option tray information is on. As described above, condition for transmitting the corresponding request command is defined in the transmission condition of the request command and the transmission condition 1401.

FIG. 15B illustrates another example of the request command and the transmission condition to be stored in the Queue Property Bag 612. When the setting unit 721 sets the request command and the transmission condition 1401 in the Queue Property Bag 612 as illustrated for example in FIG. 15B, the request command key and the value corresponding to the request command key are set in a pair. Further, as illustrated for example in FIG. 15B, the setting unit 721 sets the request command and corresponding transmission condition as the value corresponding to the request command key.

The USB Bidi Extender 570 can read the request command and the transmission condition from the Queue Property Bag 612 by designating the request command key.

Further, the USB Bidi Extender 570 according to the present embodiment has a transmission determination unit 1402 implemented by JavaScript (USB Bidi JavaScript). The transmission determination unit 1402 acquires the value corresponding to the request command key as illustrated for example in FIG. 15B and determines whether or not to transmit each request command to the image forming apparatus 102.

The functional configuration of the information processing apparatus 101 other than the above is similar to the functional configuration of the information processing apparatus 101 according to the first embodiment illustrated in FIG. 7.

Processing Flow

Processing flow of the information processing method according to the second embodiment is described below.

Figure 16:
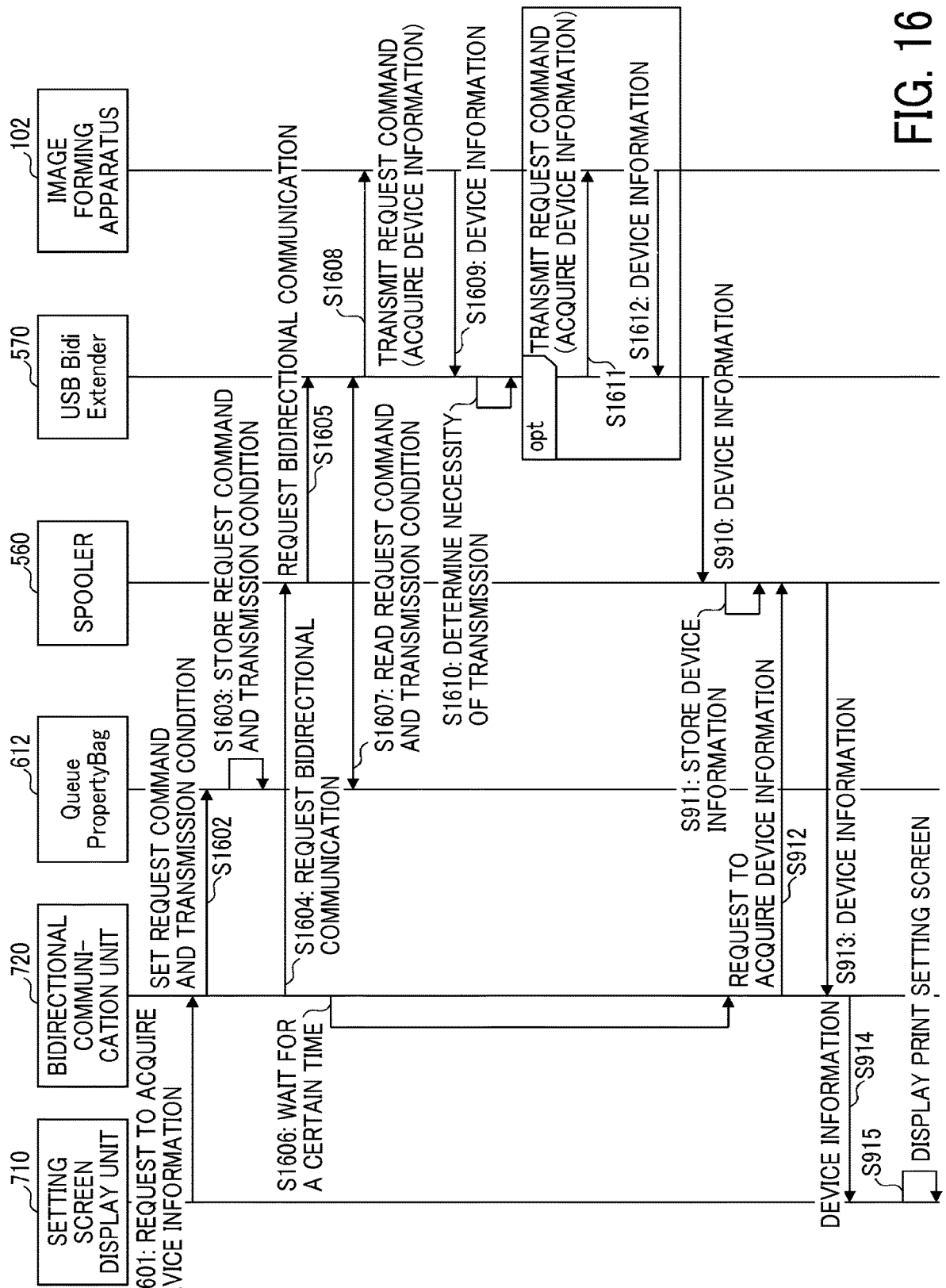
FIG. 16 is a sequence diagram illustrating processing executed by the information processing system according to the second embodiment of the present disclosure.

FIG. 16 is a flowchart illustrating an example of processing of the information processing apparatus according to the second embodiment. FIG. 16 illustrates an example of processing when the setting screen display unit 710 of the printer driver 530 displays the print setting screen reflecting the device information of the image forming apparatus 102. Note that steps S910 to S915 illustrated in FIG. 16 are the same as the processing according to the first embodiment illustrated in FIG. 9, and a description is given focusing on differences from the first embodiment.

In step S1601, the setting screen display unit 710 of the printer driver 530 requests the bidirectional communication unit 720 to acquire the device information of the image forming apparatus 102 connected to the information processing apparatus 101.

In steps S1602 and S1603, the setting unit 721 of the bidirectional communication unit 720 causes the Queue Property Bag 612 corresponding to the printer driver 530 to store the request command and the transmission condition 1401 corresponding to the printer driver 530. As an example, it is assumed that the request command key and the value (request command and transmission condition) as illustrated in FIG. 15B are stored in the Queue Property Bag 612.

In steps S1604 and S1605, the request unit 722 of the bidirectional communication unit 720 requests the USB Bidi Extender 570 for bidirectional communication via the spooler 560. It is assumed that the request command key "BidiRequestCommand" as illustrated for example in FIG. 15B is included in the request for bidirectional communication.

In step S1606, the bidirectional communication unit 720 waits for a certain length of time until the processing of the USB Bidi Extender 570 is completed.

In step S1607, the USB Bidi Extender 570 reads the request command and transmission condition from the Queue Property Bag 612 using the request command key included in the request for bidirectional communication.

In steps S1608 and S1609, the USB Bidi Extender 570 transmits request information with the transmission condition "True" to the image forming apparatus 102 in the acquired request command and transmission condition and acquires the device information transmitted from the image forming apparatus 102.

In step S1610, the transmission determination unit 1402 of the USB Bidi Extender 570 determines whether transmission is necessary for the request command with transmission condition other than "True", and when it is determined that transmission is necessary, causes steps S1611 and S1612 to be executed.

In steps S1611 and S1612, the USB Bidi Extender 570 transmits a request command determined to be transmitted to the image forming apparatus 102 and acquires the device information transmitted from the image forming apparatus 102.

FIG. 17A and FIG. 17B are diagrams illustrating an example of the device information according to the second embodiment. FIG. 17A and FIG. 17B illustrate an example of the device information acquired from the image forming apparatus 102 in steps S1608 to S1612 of FIG. 16. For example, in steps S1608 and S1609 in FIG. 16, option information (Option) and tray information (InputTray) as illustrated in FIG. 17A are acquired. In addition, optional tray information (OptionTray) as illustrated in FIG. 17B is acquired by the processing in steps S1610 to 1612 in FIG. 16.

"Option Tray=ON" included in the "Option" information illustrated in FIG. 17A indicates that the optional tray is mounted on the image forming apparatus 102.

Also, the "Option Tray" information of FIG. 17B indicates that trays 2 and 3 are mounted as optional trays on the image forming apparatus 102, the paper size of tray 2 is B5, and the paper size of tray 3 is A3.

In the above example, description has been made assuming that the setting unit 721 of the printer driver 530 stores table information as illustrated in FIG. 15B in the Queue Property Bag 612 corresponding to the printer driver 530.

As another example, the setting unit 721 of the printer driver 530 may store a JavaScript source code 1501 as illustrated in FIG. 15C in the Queue Property Bag 612 as the request command and transmission condition 1401. Note that the JavaScript source code 1501 is an example of a script language.

In this case, the USB Bidi Extender 570 acquires the device information from the image forming apparatus 102 by executing JavaScript as illustrated in FIG. 15C acquired from the Queue Property Bag 612.

The request command and the transmission condition 1401 may be set in the Queue Property Bag 612 before the acquisition of the device information from the setting screen display unit 710 is requested, as in the process illustrated in FIG. 13 for the first embodiment.

In the above description, the printer driver 530 is assumed to be a V4 printer driver, but the present disclosure is also applicable to other printer drivers having restrictions similar to those of the V4 printer driver.

As described above, according to each of the above embodiments, the bidirectional communication with the image forming apparatus can be made correctly, in the V4 printer driver or the printer driver having the same restriction, when utilizing the USB port by a plurality of printer drivers.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus with a plurality of printer drivers installed, the information processing apparatus comprising:
storage areas respectively corresponding to the plurality of printer drivers and external to the plurality of printer drivers; and
circuitry configured to execute a communication control program to perform bidirectional communication with an image forming apparatus in response to a request from each of the plurality of printer drivers,
wherein each one of the plurality of printer drivers configures the circuitry to:
set control information in the storage area corresponding to the respective printer driver; and
request the communication control program to perform the bidirectional communication with the image forming apparatus based on the control information set in the storage area corresponding to each printer driver,
wherein the communication control program includes a single USB Bidi Extender that is utilized by all of the plurality of printer drivers, wherein the singe USB Bidi Extender has access to all of the storage areas respectively corresponding to the plurality of printer drivers.

2. The information processing apparatus of claim 1, wherein the control information includes request information that requests acquiring information from the image forming apparatus.

3. The information processing apparatus of claim 2, wherein the control information further includes a transmission condition to send the request information to the image forming apparatus.

4. The information processing apparatus of claim 3, wherein the communication control program configures the circuitry to send the request information to the image forming apparatus according to the transmission condition.

5. The information processing apparatus of claim 2, wherein the control information includes script language to control transmission of the request information that requests acquiring information from the image forming apparatus.

6. The information processing apparatus of claim 1, wherein the communication control program configures the circuitry to perform a process common to the one or more printer drivers in response to the requests from the one or more printer drivers.

7. The information processing apparatus of claim 1, wherein the storage area includes a Queue Property Bag corresponding to each of the plurality of printer drivers.

8. An information processing system comprising:
an information processing apparatus with a plurality of printer drivers installed; and
an image forming apparatus communicably connected to the information processing apparatus, the information processing apparatus including circuitry configured to execute a communication control program to perform bidirectional communication with the image forming apparatus in response to a request from each of the plurality of printer drivers,
wherein each of the plurality of printer drivers configures the circuitry to:
set control information in a storage area corresponding to the respective printer driver and external to the respective printer driver; and
request the communication control program to perform the bidirectional communication with the image forming apparatus based on the control information set in the storage area corresponding to each printer driver,
wherein the communication control program includes a single USB Bidi Extender that is utilized by all of the plurality of printer drivers, wherein the singe USB Bidi Extender has access to all of the storage areas respectively corresponding to the plurality of printer drivers.

9. The information processing system of claim 8, wherein the control information includes request information that requests acquiring information from the image forming apparatus.

10. The information processing system of claim 9, wherein the control information further includes a transmission condition to send the request information to the image forming apparatus.

11. The information processing system of claim 9, wherein the control information includes script language to control transmission of the request information that requests acquiring the information from the image forming apparatus.

12. A non-transitory recording medium storing instructions which, when executed by a processor of an information processing apparatus, cause the processor to perform an information processing method comprising:
setting control information in a storage area corresponding to each of a plurality of printer drivers installed to the information processing apparatus and external to the plurality of printer drivers, using the plurality of printer drivers;

in response to a request from each of the plurality of printer drivers, requesting a communication control program installed to the information processing apparatus to perform bidirectional communication with an image forming apparatus based on the control information set in the storage area corresponding to each printer driver; and performing the bidirectional communication with the image forming apparatus based on the stored control information, using the communication control program, wherein the communication control program includes a single USB Bidi Extender that is utilized by all of the plurality of printer drivers, wherein the singe USB Bidi Extender has access to all of the storage areas respectively corresponding to the plurality of printer drivers.

13. The non-transitory recording medium of claim 12, wherein the control information includes request information that requests acquiring information from the image forming apparatus.

14. The non-transitory recording medium of claim 13, wherein the control information further includes a transmission condition to send the request information to the image forming apparatus.

15. The non-transitory recording medium of claim 13, wherein the control information includes script language to control transmission of the request information that requests acquiring the information from the image forming apparatus.

* * * * *